United States Patent [19]

Lindlar et al.

[11] Patent Number: 4,474,512
[45] Date of Patent: Oct. 2, 1984

[54] MILLING TOOL WITH ADJUSTABLE CUTTER BIT

[75] Inventors: Willi Lindlar, Cologne; Guenter Wermeister, Ratingen, both of Fed. Rep. of Germany

[73] Assignee: Santrade Ltd., Lucerne, Switzerland

[21] Appl. No.: 305,681

[22] Filed: Sep. 25, 1981

[30] Foreign Application Priority Data

Sep. 27, 1980 [DE] Fed. Rep. of Germany ....... 3036527

[51] Int. Cl.³ .............................................. B26D 1/12
[52] U.S. Cl. ...................................... 407/39; 407/41; 407/46; 407/49; 408/173; 408/188
[58] Field of Search ..................................... 407/36–39, 407/41, 42, 45, 46, 48, 49; 408/173, 146, 147, 190, 197, 174, 153, 188

[56] References Cited

U.S. PATENT DOCUMENTS

| | | | |
|---|---|---|---|
| 2,690,610 | 10/1954 | Begle et al. | 407/41 X |
| 3,057,043 | 10/1962 | Hussex | 407/36 |
| 3,162,929 | 12/1964 | Horne et al. | 407/46 X |
| 3,216,086 | 11/1965 | Kryszek | 407/91 X |
| 3,236,125 | 2/1966 | Lundgren | 407/79 X |
| 3,447,578 | 6/1969 | Mitten | 407/45 X |
| 3,498,164 | 3/1970 | Miko et al. | 408/153 X |
| 3,831,237 | 8/1974 | Gunsalus | 407/41 |
| 4,038,732 | 8/1977 | Hunkeler | 407/39 |

FOREIGN PATENT DOCUMENTS

| | | | |
|---|---|---|---|
| 0132472 | 10/1978 | Fed. Rep. of Germany | 407/39 |
| 589514 | 6/1947 | United Kingdom | 408/188 |

Primary Examiner—William R. Briggs
Assistant Examiner—Lawrence Meier
Attorney, Agent, or Firm—Burns, Doane, Swecker & Mathis

[57] ABSTRACT

A milling tool comprises a plurality of cutting bit holders mounted by clamps on the tool circumference. Each holder is mounted in a radial recess which is inclined with respect to the longitudinal axis of the tool. A pair of set screws are arranged for displacing each holder in a radial direction of the tool. Independently of such displacement, the bit holder is adjustable in an axial direction of the tool by means of an eccentric. The bit holder may also be displaced about an axis perpendicular to the plane of the cutter bit.

6 Claims, 15 Drawing Figures

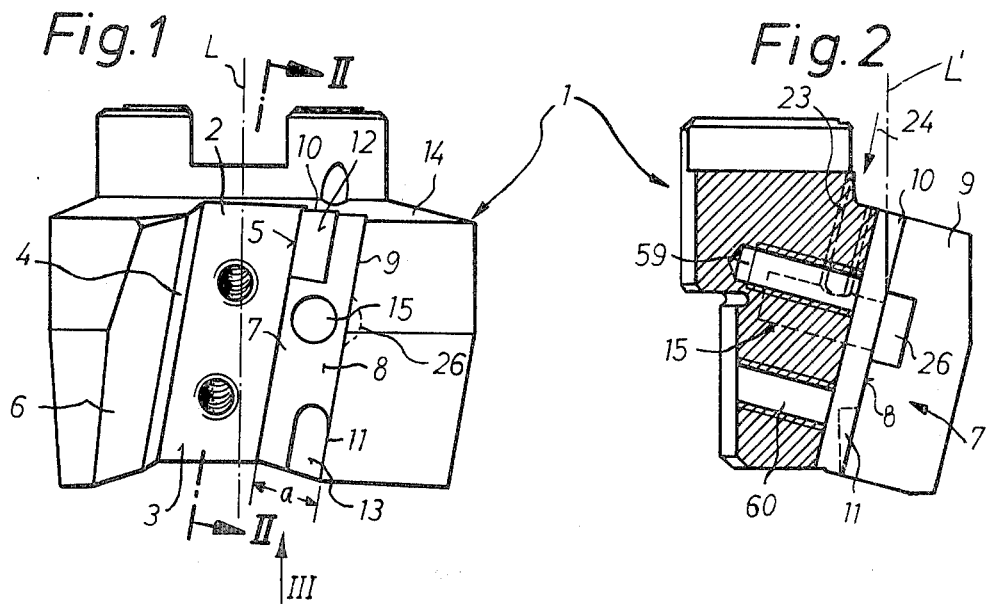
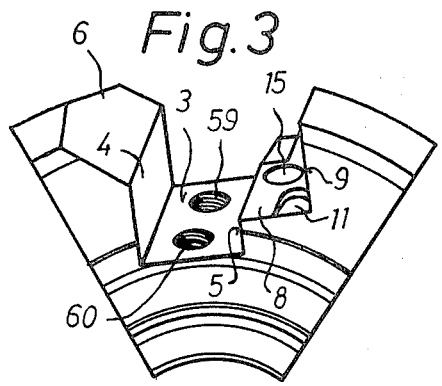
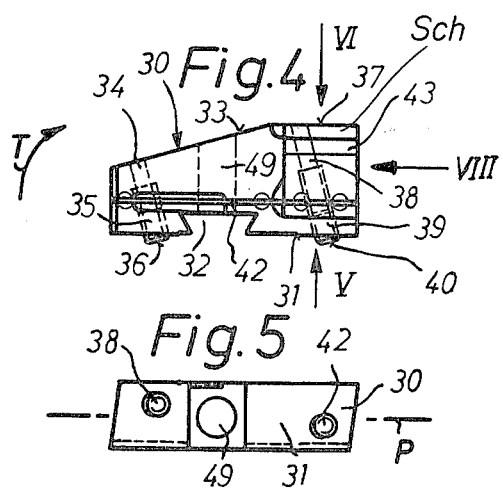
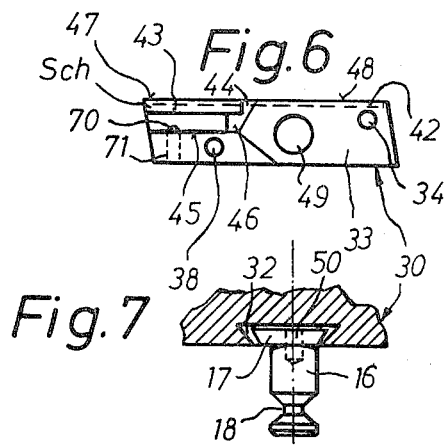
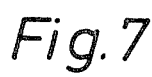
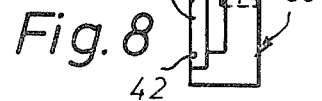
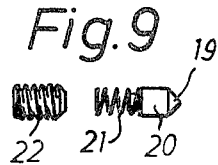

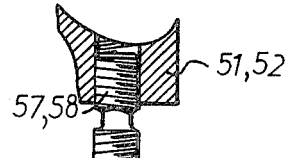
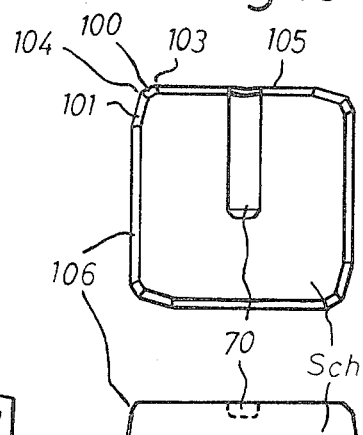
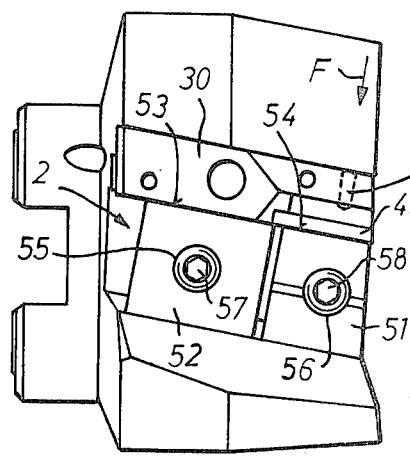
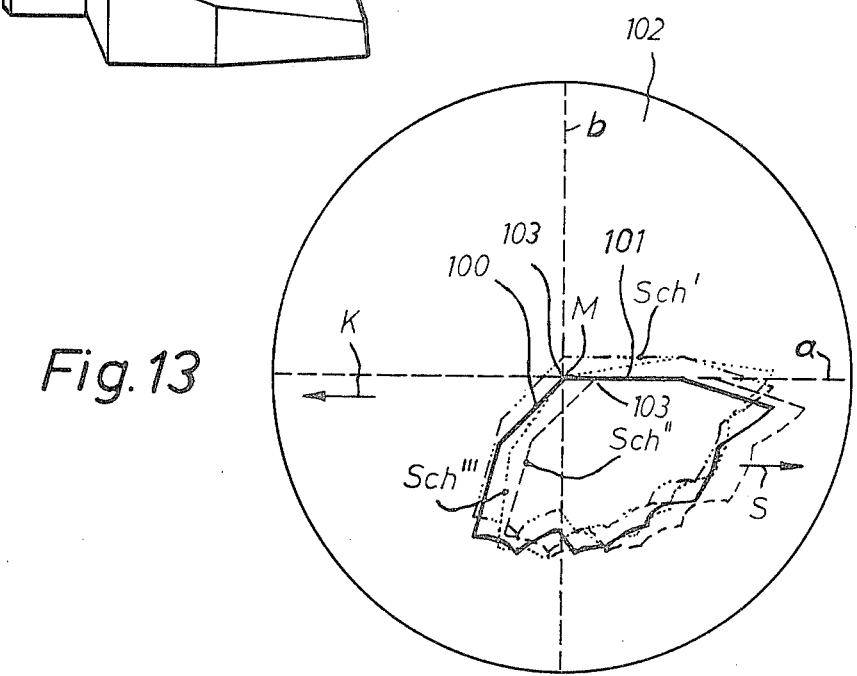

MILLING TOOL WITH ADJUSTABLE CUTTER BIT

BACKGROUND AND OBJECTS OF THE INVENTION

The invention concerns a milling tool of the type having a plurality of circumferentially spaced cutting bit holders mounted by clamps on the tool circumference. The holders are arranged in radial recesses which are inclined with respect to the horizontal axis of the tool. The holders are adjustable in a radial direction and, by means of an eccentric, in an axial direction as well.

Milling tools of this type are known. Therein, the cutting bit holder is disposed upon the bottom of a recess inclined by approximately 15°-20° to the longitudinal axis of the tool. The axial displacement of the edge holder therefore necessarily also effects a radial displacement.

It is the object of the invention, in contrast to the known milling tools, to provide a milling tool of the abovedescribed type having an extended tool life of the edges of the cutting blades and a wider range of possible adjustment, together with greater precision of the setting of the cutting edge. Setup is to be effected within a short period of time, while the means provided for that purpose should be simple in layout and inexpensive.

BRIEF SUMMARY

This object is achieved by a milling tool of the type having cutting bit holders held by clamps on the tool circumference in approximately radial recesses which are inclined with respect to the longitudinal axis of the tool. Means are provided for displacing each bit holder in a radial direction and, independently thereof, in an axial direction, and for tilting each bit holder about an axis disposed perpendicular to the plane of the cutter bit.

Preferably, the radial adjustment of the tool is carried out by a pair of setting screws which are adjustable against bottom sections of the recesses which receive the holder.

The milling tool according to the invention has the advantage that the radial location of the principal and end cutting edges of the bits may be set accurately within a short period of time by means of two screws adjustable in their longitudinal direction, without the need for an axial adjustment. Furthermore, the cutting bit holder may be tilted so that the principal cutting edge may be given a variable angular position with respect to the longitudinal axis of the tool.

THE DRAWING

In the drawing, an example of embodiment of the cutting tool according to the invention is presented. In the drawing:

FIG. 1 shows a top view, in the radial direction, of a segment of a cylindrical tool with the recess receiving the cutting edge holder and the clamping elements;

FIG. 2 is a cross-sectional view taken along line II—II of FIG. 1;

FIG. 3 depicts a view of the milling tool segment in the direction of the arrow III of FIG. 1;

FIG. 4 depicts the cutting bit holder in a lateral elevation;

FIG. 5 depicts the same holder in a bottom view in the direction of the arrow V in FIG. 4;

FIG. 6 depicts a top view of the cutting bit holder in the direction of the arrow VI in FIG. 4;

FIG. 7 depicts the engagement of the eccentric in the corresponding recess of the cutting bit holder;

FIG. 8 depicts a front elevation of the cutting bit holder with a recess receiving the cutting bit;

FIG. 9 depicts a screw holding the eccentric in the milling tool with a spring plunger and holding pin;

FIG. 10 depicts a cutting bit to be used, in top view, a rear view and a side elevation;

FIG. 10A depicts the cutting bit in side elevation;

FIG. 11 is a sectional view through one of two clamping elements;

FIG. 12 is a view taken along the radius of the tool section according to FIG. 1, with the cutting bit holder and clamping elements inserted;

FIG. 13 depicts the image in a transparency slide projector of a cutting edge corner with the possible adjustment of the cutting edge in the axial and radial direction with respect to the milling tool, and into a position inclined with respect to the radial of the milling tool;

DETAILED DESCRIPTION OF A PREFERRED EMBODIMENT OF THE INVENTION

Figure 14:
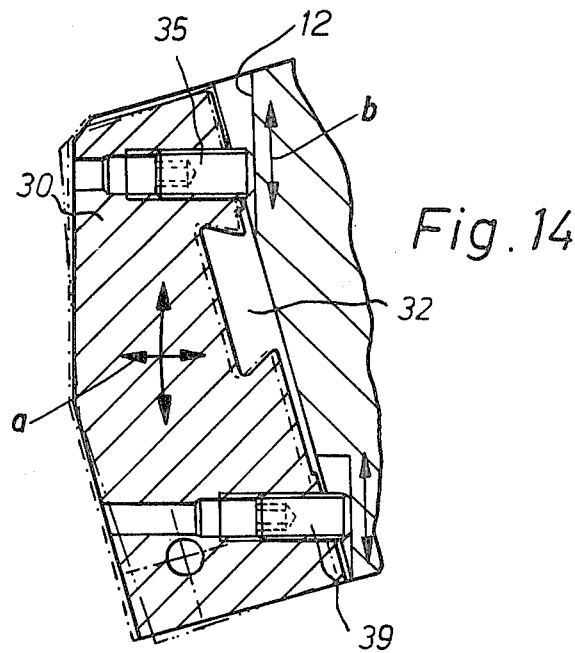
FIG. 14 is a cross-sectional view through the cutting bit holder in its different adjusting positions.
Figure 15:
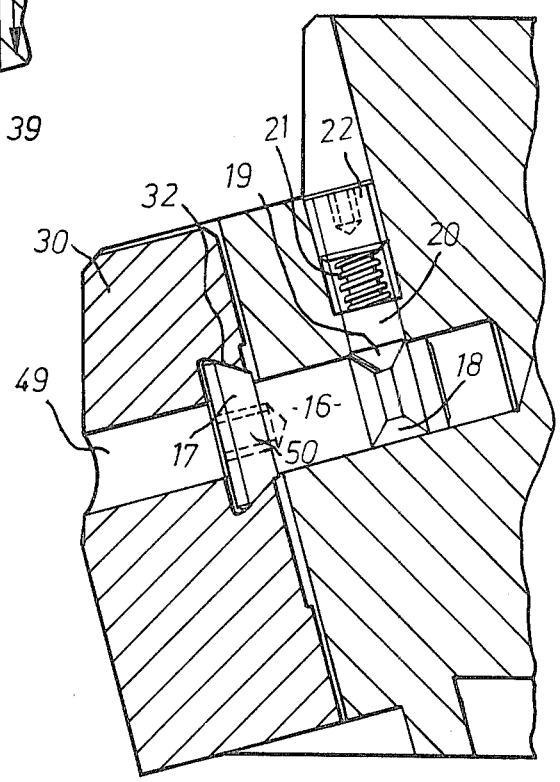
FIG. 15 depicts the eccentric with its mushroom like head in the corresponding recess of the cutting bit holder.

The cylindrical tool 1 (only a segment of which being depicted) carries at uniform angular distances on its circumference a plurality of recesses 2, only one of which is shown in the drawing. The recess is inclined (FIG. 2) with respect to the longitudinal axis L of the tool (or with respect to a line L' parallel to such axis. The recess is defined by a bottom 3 and two side walls 4, 5, with the side wall 4 intersecting a bevel 6. The side wall 5 terminates at a recess 7 for the cutting edge holder. The recess 7 extends parallel to the recess 2 and has a width a corresponding to the width of a cutting bit or cutting edge holder 30, to be described in more detail hereinafter. The side wall 9 of the recess 7 corresponds in outline to that of the cutting bit holder and of the tool 1.

In the longitudinal direction of the recess 7, its bottom 8 has two narrow recesses or grooves 10, 11 relatively offset circumferentially and in the longitudinal direction of the recess 7. The planes defined by bottoms 12, 13 of those grooves 10, 11 are inclined to the plane of the bottom 8 (which is disposed parallel to the bottom 3 of the recess 2). A blind hole 15 is disposed approximately in the center of the recess 7. The hole 15 extends in the radial direction of the tool. A cutting bit holder 30 has mounted therein a fastener comprising an eccentric head 17 of frusto-conical configuration disposed in a recess 32 of the holder 30. Projecting from the head 17 in an eccentric manner is a pin 16, the pin projecting into the blind hole 15. The pin 16 carries an annular constriction or groove 18, which may be engaged by a retainer for the purpose of securing the cutting bit holder against the effects of centrifugal force. A suitable retainer comprises a pin 20 having a foot 19 which is urged into the groove 18 by the action of a spring 21. The spring bears against a stop formed by a grub screw 22. The pin 20, the spring 21 and the grub screw 22 may be mounted in a threaded bore 23 in the direction of the arrow 24 (FIG. 2) into the tool 1, so that the eccentric head 17 may be rotated around the axis 25 of the pin 16, while the grub screw 22 is maintained in its position. In order to make possible the rotating motion of the frustum-shaped eccentric head 17, the side wall 9 may be provided with an outward convexity 26 (FIG. 1 and 2). The arrangement of the eccentric head 17, the recess 32 of the cutting bit holder receiving it, and the safety pin 21, create a safety device against the centrifugal force that occurs in addition to the clamping mount of the cutting bit Sch (FIG. 10) and cutting bit holder 30, to be described in more detail hereinbelow.

The cutting bit holder 30 to be used herein, has a bottom side 31, in which a dovetail-shaped recess 32 is provided, the latter to be engaged by the frustum-shaped eccentric head 17. The recess 32 is larger than the eccentric head 17, without thereby affecting the setting movements of the cutting bit holder (FIG. 7). From a beveled top side 33 of the holder, a threaded bore 34 extends, the latter being inclined with respect to the plane of the bottom side 31 and thus inclined to the bottom of the recess 7. Into the bore 34 a grub screw 35 may be screwed, with the end 36 of the grub screw 35 protruding from the bottom 31 (FIG. 4). From a top side section 37 of the cutting bit holder 30 a similar bore 38 extends, the grub screw 39 and the end 40 of which protrude from the bottom 31. The bores 34, 38 are at right angles to the planes of the bottom 12, 13 of the grooves 11, 12 in the bottom 8 of the recess 7. The ends 36, 40 may therefore extend perpendicularly to such bottoms 12, 13 when the grub screws 35, 39 are screwed in and out of their bores 34, 38 in a radial direction of the tool. The screws 35, 39 are located to opposite sides of a center plane of the holder 30. A holder piece 43 is held against the cutting bit holder 30 with the aid of a flat leaf spring 42 received in slits in the holder piece and holder. The holder piece 43 projects resiliently into a recess 44 of the cutting bit holder, such recess being defined by a wall 45 and a bottom 46 (FIG. 6). The recess corresponds in its dimensions to the cutting bit Sch to be received by it. The recess 44 and the holder piece 43 are dimensioned so that its outer side 47 lies flush with the wall 48 of the cutting bit holder 30 (FIG. 6). From the beveled top side 33 of the holder 30, a bore 49 extends into communication with the recess 32. A suitable tool may be inserted through the bore 49 whereby the head thereof may be inserted into a multi-sided recess 50 of the eccentric 17 (FIG. 7). Accordingly, the eccentric may be rotated around the axis 25 of its pin 16.

The cutting bit holder 30 is held by two clamping elements 51, 52 (FIGS. 11 and 12), inserted into the recess 2 of the tool with their lateral surfaces 53, 54 abutting clampingly against (i) the side wall 48 of the cutting edge holder 30 and (ii) the holder piece 43, thereby holding those pieces in their positions. The two clamping elements 51 and 52 are equipped with threaded bores 55, 56, through each of which is inserted a bolt 57, 58 with first and second opposing threads. Each bolt 57, 58 has its second or lower threads screwed radially into bores 59, 60 in the bottom 2 of the recess 3 of the tool radially inwardly.

The cutting bit Sch, a single edge bit, has a groove 70 extending over part of the cutting bit and receiving the projecting head of a pin 71, inserted in the holder 30.

The possible settings of the cutting bit Sch are explained with the help of FIGS. 13 and 14. With the aid of the above-described adjusting means of the cutting bit holder 30, the principal edge 100 and the end cutting edge 101 of the bit Sch may be given a definite position with respect to the axes a, b of the tool. This position may be represented on the screen 102 of a transparency projector shown in FIG. 13. Here, the corner edge 103 is used for positioning between the principal and end cutting edges 100, 101 with respect to the cross-hairs M. In the position Sch' of the cutting bit indicated by the dash-and-dot line, the corner edge 103 lies displaced in an axial direction with respect to the cross-hairs M. It will be appreciated that the holder 30 is supported on the floor 8 by means of the screws 35, 39 engaging the bottoms 12, 13 of the grooves 10, 11 (which bottoms 12, 13 are parallel to the tool axis). Thus, the bottom 31 of the holder is likely to be spaced from the floor 8 (FIG. 14). By adjusting the eccentric, the holder is displaced in the longitudinal direction, parallel to the tool axis L, since the screws 35, 39 ride along the bottoms 12, 13 which are parallel to the tool axis, there being sufficient play between the eccentric and its slot 32 to permit this. Thus, by actuating the eccentric head 17, the position Sch indicated by the solid lines of FIG. 13 may be obtained.

In position Sch" (dash lines), the corner edge 103 lies displaced in the direction of the arrow S with respect to the cross-hairs M. By means of the corresponding actuation of both screws 35, 39 arranged on either side of the center plane of the cutting bit holder 30, the cutting edge holder 30 may be displaced in a radial direction K so that the corner edge 103 is again at the height of the cross-hairs M and the cutting edge is in the position Sch indicated by the solid line in FIG. 13.

From the positions Sch, Sch' and Sch" represented herein, the cutting edge may be brought into the position Sch''', inclined to the axes a, b of the cross-hairs, by actuating the eccentric head 17 for displacement in the direction of the axis b and letting the two screws 35, 39 initially determine together the position in the direction of the arrow K, but then adjusting one of the screws (or both screws) independently of each other, so that the cutting edge is placed into its inclined Sch''' position, by tilting the bit in direction T (FIG. 4) about an axis disposed perpendicular to the longitudinal plane P (FIG. 5) of the bit holder.

Although the invention has been described in connection with a preferred embodiment thereof, it will be appreciated by those skilled in the art, that additions, modifications, substitutions, and deletions not specifically described, may be made without departing from the spirit and scope of the invention as defined in the appended claims.

What is claimed is:

1. In combination a milling tool of the type which is rotatable about an axis and cutting holders clamped in approximately radial recesses in the periphery of said tool by adjustable clamping means; first adjustment means for adjusting each bit holder in a generally axial direction relative to said tool bit axis and within a longitudinal plane defined by said bit holder, said first adjusting means being mounted in said tool and including an adjustable eccentric which engages said bit holder to move said bit holder in said generally axial direction relative to said recess; second adjusting means for moving said bit holde relative to said tool selectively in a generally radial direction and a tilting direction, said second adjusting means comprising a plurality of setting screws threadedly mounted in said bit holder for adjustment in a generally radial direction and being spaced apart in said generally axial direction with said eccentric being disposed intermediate said axially-spaced screws, said setting screws projecting from said bit holder with bottom end tips of said screws bearing respectively against surface portions at the bottom of said recess, said setting screws being individually adjustable in said generally radial direction to move said bit holder relative to said recess selectively in said generally radial direction and in a tilting direction wherein said bit holder is tilted about an axis disposed generally perpendicularly to said longitudinal plane of said bit holder.

2. Apparatus according to claim 1, wherein said first adjusting means is rotatably mounted within a generally radial hole in said tool, with said eccentric comprising an eccentric head rotatably disposed within a cavity of said bit holder, said bit holder including a bore aligned with said first adjusting means to provide access to the latter for rotation, said setting screws comprising first and second setting screws disposed on opposite sides of said eccentric head.

3. Apparatus according to claim 2, wherein said setting screws bear against the bottoms of grooves which are formed in said recess, said groove bottoms being elongate in said generally axial direction, the planes of said groove bottoms being parallel to siad axis of rotation of said tool.

4. Apparatus according to claim 2, wherein said groove bottoms form an angle relative to the portions of the bottom of said recess in which said grooves are formed.

5. Apparatus according to claim 2, wherein said eccentric head is frusto-conically shaped, and said cavity in said tool holder comprises a dove-tailed slot in a side of said bit holder which faces the bottom of said recess.

6. Apparatus according to claim 2, wherein said cavity of said bit holder is larger than said eccentric head to provide sufficient play to accommodate movement of said bit holder in said generally radial and tilting directions.

* * * * *